United States Patent [19]
Liau et al.

[11] Patent Number: 5,807,622
[45] Date of Patent: Sep. 15, 1998

[54] CURVED SURFACES FORMED BY ETCHING AND THERMAL PROCESSING

[75] Inventors: Zong-Long Liau, Belmont; Richard C. Williamson, Sudbury, both of Mass.

[73] Assignee: Massachusetts Institute of Technology, Cambridge, Mass.

[21] Appl. No.: 818,071

[22] Filed: Mar. 14, 1997

Related U.S. Application Data

[62] Division of Ser. No. 313,550, Sep. 27, 1994, Pat. No. 5,618,474, which is a continuation of Ser. No. 901,375, Jun. 19, 1992, abandoned.

[51] Int. Cl.$^6$ .................................. B32B 3/00; G02B 5/18
[52] U.S. Cl. .......................... 428/156; 428/120; 428/213; 359/570; 359/573; 359/575; 359/741; 359/743
[58] Field of Search .................................... 428/156, 167, 428/119, 120, 141, 213; 359/741, 743, 573, 742, 570, 571, 575

[56] References Cited

U.S. PATENT DOCUMENTS

| | | | |
|---|---|---|---|
| 4,468,850 | 9/1984 | Liau et al. | 29/569 |
| 4,650,744 | 3/1987 | Amano | 430/313 |
| 4,718,070 | 1/1988 | Liau et al. | 372/50 |
| 4,722,092 | 1/1988 | Liau et al. | 372/96 |
| 4,777,148 | 10/1988 | Liau et al. | 437/129 |
| 4,784,722 | 11/1988 | Liau et al. | 156/649 |
| 4,894,840 | 1/1990 | Liau et al. | 372/108 |
| 4,935,939 | 6/1990 | Liau et al. | 372/98 |
| 4,990,465 | 2/1991 | Liau et al. | 437/129 |
| 5,153,052 | 10/1992 | Tanaka et al. | 428/212 |

OTHER PUBLICATIONS

Goodhue, W. D., et al., "Monolithic Two–Dimensional Surface–Emitting Strained–Layer InGaAs/AlGaAs and AlInGaAs/AlGaAs Diode Laser Arrays with Over 50% Differential Quantum Efficiencies," *Appl. Phys. Lett.* 59(6): 632–634 (1991).

Liau, Z. L., "Prevention of In Evaporation and Preservation of Smooth Surface in Thermal Annealing and Mass Transport of InP," *Appl. Phys. Lett.* 58(17):1869–1871 (1991).

Goodhue, W.D., et al., "Monolithic Two–Dimensional GaAs/AlGaAs Laser Arrays Fabricated by Chlorine Ion–Beam–Assisted Micromachining," *Journal of Electronic Materials*, 19(5):463–469 (1990).

Liau, Z. L., "Gallium Phosphide Microlenses by Mass Transport," *Appl. Phys. Lett.* 55(2):97–99 (1989).

Liau, Z. L., "Large–Numerical–Aperture InP Lenslets by Mass Transport," *Appl. Phys. Lett.* 52(22):1859–1861 (1988).

Wada, Osamu, "Ion–Beam Etching of InP and Its Application to the Fabrication of High Radiance InGaAsP/InP Light Emitting Diodes," *J. Electrochem. Soc.: Solid–State Science and Technology*, 131(10):2373–2380 (1984).

Liau, Z. L., "Large–Numerical–Aperture Microlens Fabrication by One–Step Etching and Mass–Transport Smoothing," *Appl. Phys. Lett.*, 64(12):1484–1486 (1994).

Liau, J. L. and Walpole, J. N., "Mass–Transported GaInAsP/InP Lasers," *The Lincoln Laboratory Journal*, 2(1):77–92 (1989).

*Primary Examiner*—Donald Loney
*Attorney, Agent, or Firm*—Hamilton, Brook, Smith & Reynolds, P.C.

[57] ABSTRACT

A smooth contoured structure is formed from a planar surface by etching mesas of equal height into the surface and heat treating the structure to mass transport material above the desired contour to fill in voids below the desired contour. In an alternate embodiment, an optical element is formed using a patterned layer of sacrificial material and thermally treating the sacrificial layer to form a precursor contour line. The line is then transformed onto a substrate and smoothed to form the optical element.

19 Claims, 6 Drawing Sheets

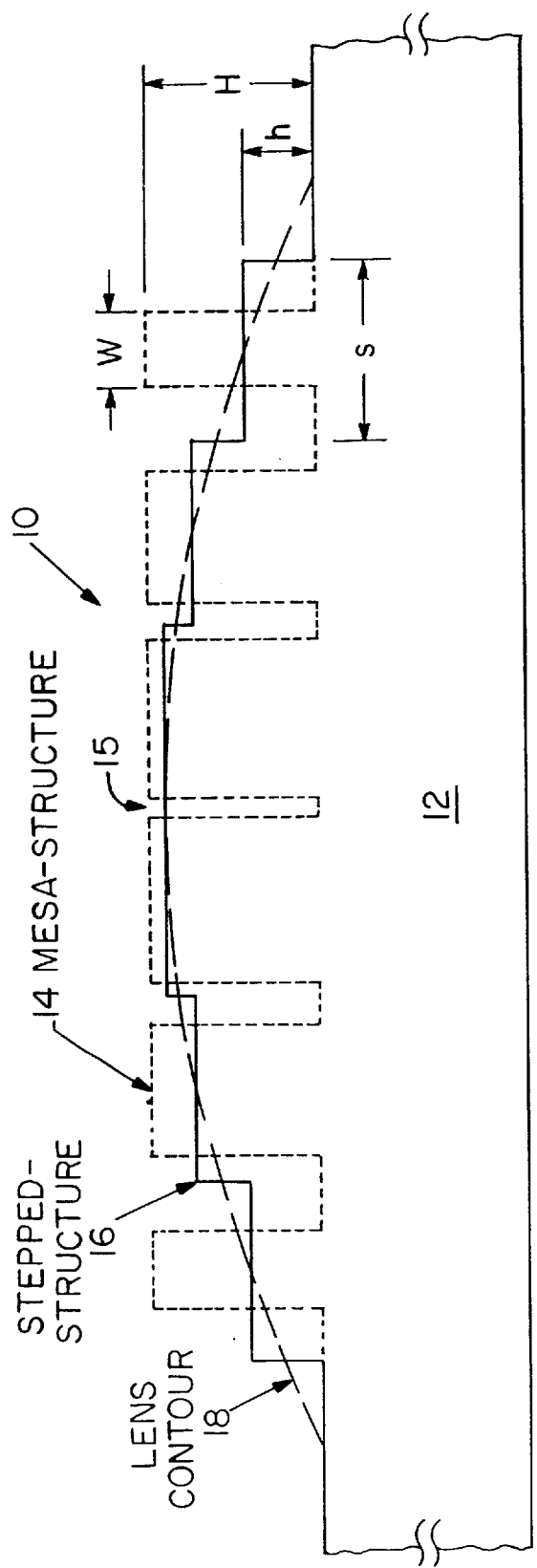
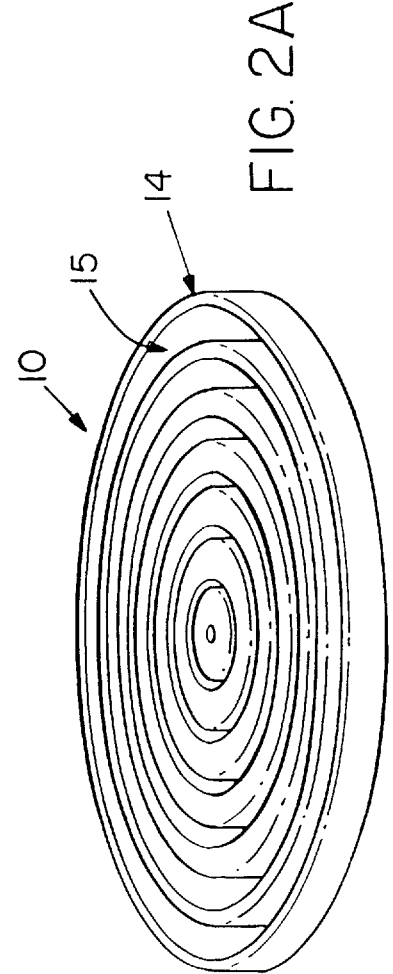
FIG. 1
FIG. 2A

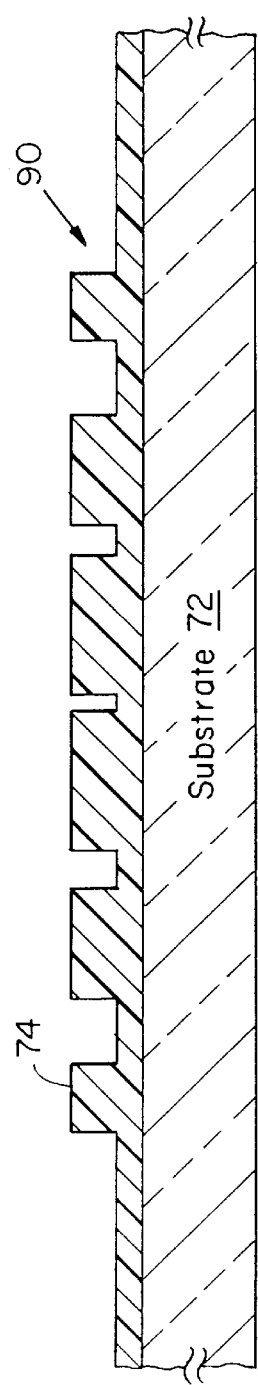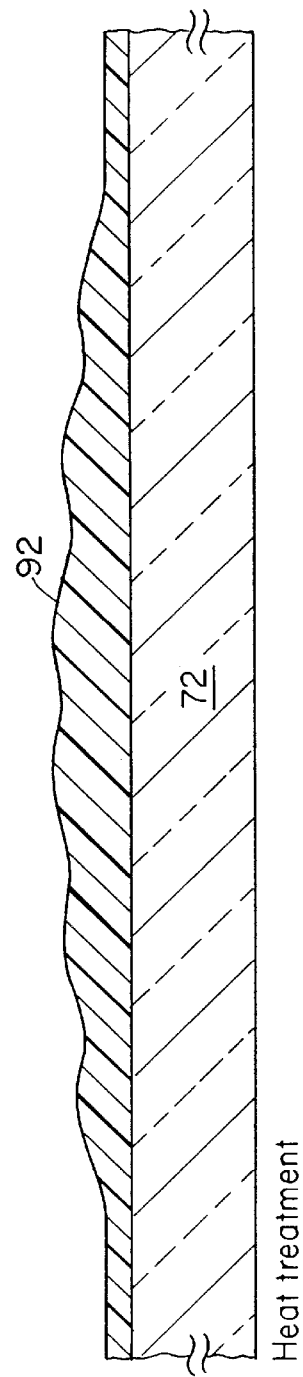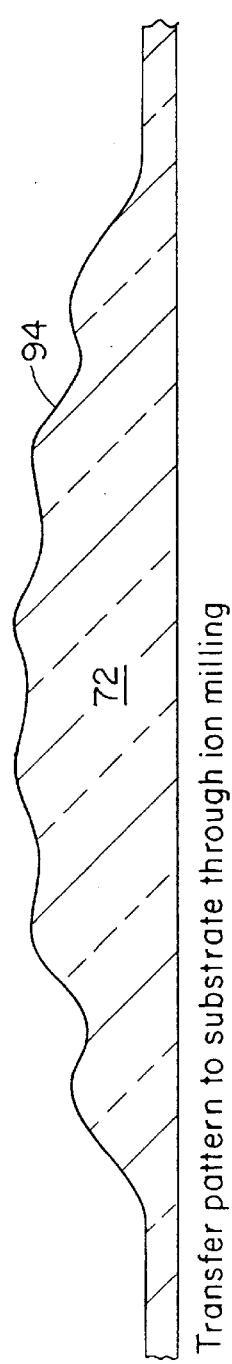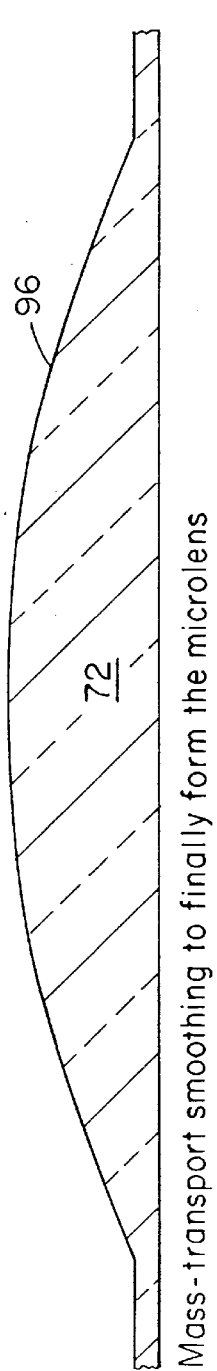
FIG. 7A — Define the mesa pattern in photoresist
FIG. 7B — Heat treatment
FIG. 7C — Transfer pattern to substrate through ion milling
FIG. 7D — Mass-transport smoothing to finally form the microlens

CURVED SURFACES FORMED BY ETCHING AND THERMAL PROCESSING

This application is a division of application Ser. No. 08/313,550 filed Sep. 27, 1994 now U.S. Pat. No. 5,618,474, which is a file wrapper continuation of Ser. No. 07/901,375 filed Jun. 19, 1992, abandoned.

GOVERNMENT FUNDING

The Government has rights in this invention pursuant to Contract Number F19628-85-C-0002 awarded by the U.S. Air Force.

BACKGROUND OF THE INVENTION

U.S. Pat. Nos. 4,784,722 and 4,935,939 (incorporated herein by reference) disclose a thermal mass-transport process for forming lenses in III–V material or alloys thereof.

Specifically, FIGS. 5 and 6 and column 9 of the '722 patent disclose the concept of lens formation wherein a circular oxide mask is formed on a top planar surface of a suitable substrate. Material not underlying the mask is then etched away leaving a top step. A new oxide mask 77 is formed over the structure and the process is repeated until a stepped-shape approximating the desired lens surface is formed. The structure is then subjected to heat treatment to transport a volume of mass from above the desired lens contour line to fill voids below the contour line, thereby forming a spherical lens.

The height of each step is dependent upon the desired lens shape and is also made to satisfy the equal volume requirement (see Col. 4, lines 7–14 of '722 patent). That is, the volume to be relocated is made equal to the volume to be filled. See also FIG. 3 of the '939 patent which illustrates formation of a collimating lens in the center and a spherical mirror coaxial to the collimating lens (as described at Col. 2, line 65- Col. 4, line 42).

The above-described process is time-consuming and tedious and requires painstaking attention to detail which can result in errors. Specifically, multiple mask and etching steps are required and subsequent masks must be aligned on a no longer planar surface.

SUMMARY OF THE INVENTION

In accordance with the present invention, these problems are overcome by providing a one-step etching process for forming a curved structure. In the process of the invention, predetermined curved surfaces are provided on suitable substrate material by forming mesas of uniform height H in a planar surface of the substrate. Substrate material is removed by etching to a predetermined depth. The lateral dimensions of the mesas is related to the desired contour of the predetermined surface contour. The etched structure thus formed is then subjected to a heat treatment which results in transport of mesa material located above the desired contour to fill in voids below the desired contour. In this manner, smooth surface corresponding to the desired contour is achieved. Where the mesas are solid structures, the width W of each mesa is derived from the step height h of a corresponding hypothetical section through a stepped-mesa structure, such as the structure of FIG. 3 of the '939 patent (Note: h is given by the Δ's of FIG. 6F of the '722 patent).

The mesas may be subdivided into posts or columns to avoid forming structures with very small widths. Also, the spaces between mesas may be formed of solid structure with holes formed therein for the same purpose. The corresponding height h is derived by applying the equal volume requirement to the formula for the curve desired in the surface. For formation of any curved surface, including those which employ rings, posts or holes in the precursor, the basic principle of the method of the invention employs the assumption of local conservation of mass wherein a volume of mass from above a desired contour line is transported to fill voids below the contour line.

In accordance with the invention, W is made equal to hs divided by H wherein s & H are the section-width and height, respectively, of the mesa structure. Note: s is also equal to the center-to-center spacing between mesas. Preferably, the section width s between mesas is made equal, that is, s is a constant. This makes the process more tolerant to certain inaccuracies produced during lithography and etching.

BRIEF DESCRIPTION OF THE DRAWINGS

FIG. 1 is a schematic sectional view illustrating formation of a lens, in accordance with the invention, wherein the dashed lines indicate the desired lens contour, the solid lines indicate the stepped-structure used in the prior art to achieve such a contour, and the dotted lines indicate the corresponding mesa-structure of the present invention.

FIG. 2A is a perspective view of a ring mesa structure produced for a spherical lens in accordance with the present invention.

FIGS. 7A–7D illustrate a further process embodiment for producing thick optical elements using a photoresist.

DETAILED DESCRIPTION OF THE INVENTION

Figure 2B:
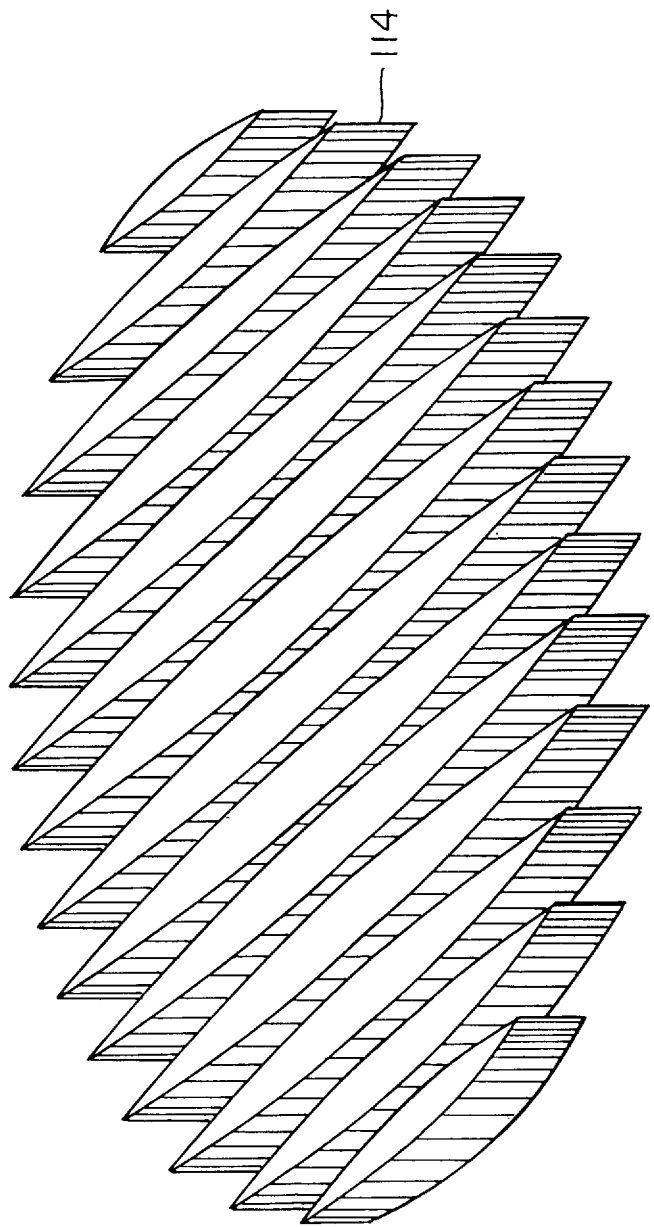
FIG. 2B is a perspective view of a spindle mesa produced for a spherical lens in accordance with the invention.

As illustrated in FIG. 1, fabrication of curved surfaces on a structure such as the microoptical structure of lens 10 starts with formation of a mesa pattern 14 (shown in dotted lines) in a suitable substrate 12. The pattern 14 has an accurate mass distribution, so that a desired lens profile or contour 18 (shown in dashed lines) is obtained after mass-transport smoothing of the pattern. Mass-transport results in local smoothing (or spreading) of the mesas similar to that described in connection with the stepped structure 16 of U.S. Pat. No. 4,935,939 (shown in dotted lines), except that here, the mass is provided by mesa width W, rather than step height h. As illustrated in FIG. 1, each nonstepped plural mesa width W in the mesa structure 14 can be derived from the height h of the corresponding section in the stepped single mesa structure 16 using the equation:

$$W = hs/H \quad \text{(Equation I)}$$

where s and H are, respectively, section-width and height in the mesa structure. The advantage of the mesa structure 14 is that the equal height of the mesas can be produced in one single etching and can be accomplished on a planar surface. The process is not only simpler, but also self-aligned. Consequently, the realignments needed in fabricating the stepped structure 16, step-by-step, are no longer required.

As the thickness of the micro structure increases, the mesa aspect ratio, i.e., ratio of the height to the width of mesas or height of the mesas to the size of the opening between mesas, increases. This makes lithography and etching difficult. One way to alleviate this problem is to make the hole size larger by making the mesa height greater than the desired thickness, as illustrated in FIG. 1. Preferably, mesas structures with high aspect ratio are formed by dry etching techniques involving energetic ions, which can cut substantially vertical mesa walls, regardless of crystallographic orientation and with literally no undercutting of the etching mask. By making the sections equally divided (i.e., s=constant), the lens fabrication can be made tolerant to certain types of inaccuracies commonly introduced by lithography and etching. With equally divided sections, any universal error in all mesa widths only results in a small net vertical shift of the entire structure profile, but without any general distortions. Equal section division is also most desirable for mass transport.

For a circularly symmetric lens, the two-dimensional mesa pattern can be either concentric mesa rings 14 of varied width (FIG. 2A) or parallel spindles 114 of varied length and width (FIG. 2B). The spindles 114, being very close to a one-dimensional structure, suffer less from any crystallographic-orientational effect in etching or mass transport.

Figure 2C:
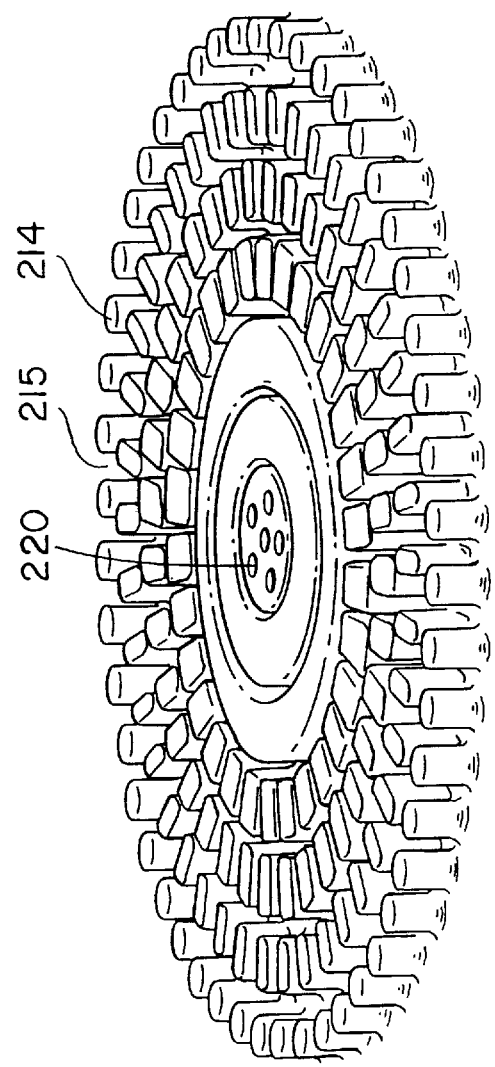
FIG. 2C is a perspective view of a ring mesa structure as in FIG. 2A wherein the mesas are radially subdivided into circumferential posts and the inner spaces are formed of holes.

Alternatively, as shown in FIG. 2C, the concentric mesa rings may be formed of posts 214 with spaces 215 therebetween to avoid having to form structures with small widths. Likewise, the spaces between mesas may be formed of periodically spaced holes 220 in between mesas.

The substrates used for fabricating the microstructures may be any materials capable of being mass-transported. For fabrication of optical structures, materials, such as GaP, GaAs, InP, GaInP, GaAsP, ZnS, ZnSe, ZnTe, CdS, CdSe, CdTe, ZnCdSe, Si, Ge, quartz, and glass may be used. Single-crystal metals (e.g., Ni, Cu and Fe) may be used for reflectors or to stamp out plastic lenses. Semiconductor materials capable of being lattice-matched with III–V light emitting materials, are suitable candidates for fabrication of lens structures integral with light-emitting material. In particular, GaP and InP have been used to form lens structures in accordance with the invention.

Mass transport is carried out at elevated temperatures. One approach is to use a furnace system equipped with a suitable vapor supply (phosphorus in the cases of GaP and InP), similar to that previously described in the above-referenced U.S. patents.

For the transport of III–V materials the graphite container previously used has been replaced by a quartz container, because graphite degrades under certain experimental conditions and can become a major source of contamination. In the container, the substrate is further protected between two plates of the same material as the substrate and coated with deposited $SiO_2$. Preferably, mass transport is started at a low temperature (900°–950° C. for GaP for about 150 h depending on the size of H) to first partially smooth the deeply etched structure at a moderate rate. Higher temperatures up to 1130° C. (for GaP) are then used for about 100 h (depending on the size of s) to complete the smoothing. This low temperature start is required because the etched structure has large surface energy (especially when the vertical sidewalls are in different crystal orientations) and can result in very high mass transport rate if high-temperature treatment is directly applied. The high rate appears to result in bad crystalline quality in the transported material, which can significantly affect subsequent mass transport and lens formation. Mainly because of this need to avoid high rates, long total furnace times (approximately 300 h) have been used.

The system of the invention is capable of very accurate profile control. Therefore, advanced high performance lenses or lens systems (including arrays) can be made. These include cylindrical lenses, a spherical lenses, anamorphic lenses having different focal lengths in the two principal axes, bifocal lenses, and lenses of very large numerical apertures. An f/1 spherical lens, having an overall diameter of about 141 $\mu$m and a height of 7 $\mu$m has been fabricated in this manner. Other interesting microoptical structures, such as the micro-prisms 30 of FIG. 3 or the blazed gratings 40 of FIG. 4 can be fabricated.

Figure 3:
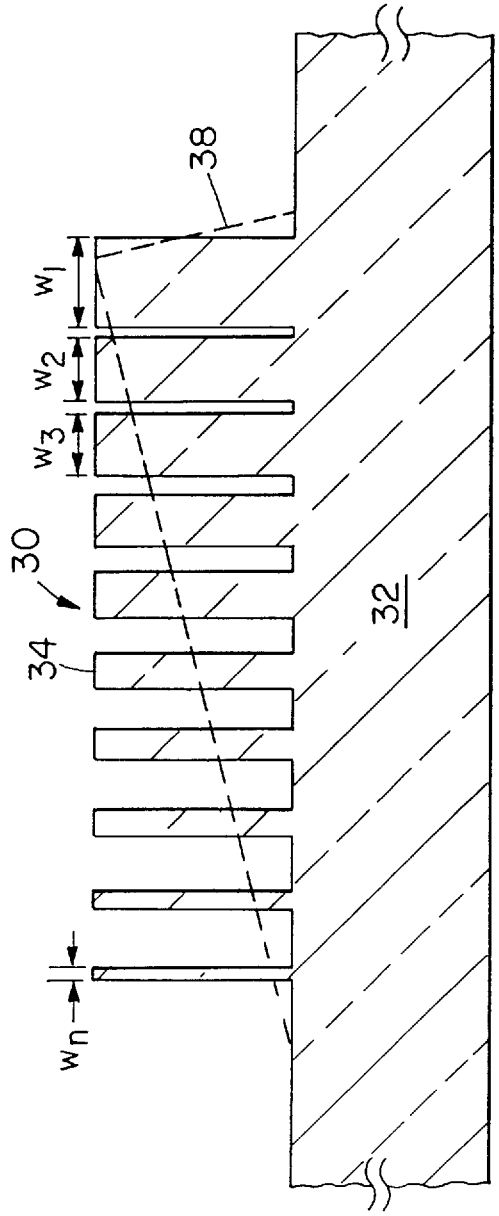
FIG. 3 is a cross-section schematic view illustrating formation of a microprism structure in accordance with the invention.
Figure 4:
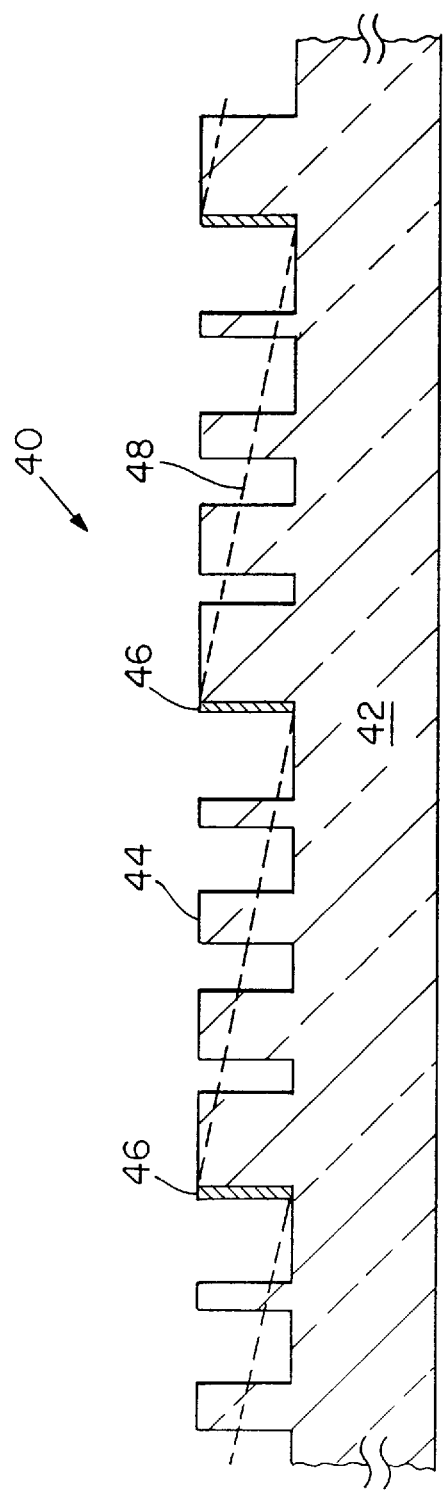
FIG. 4 is a cross-section schematic view illustrating formation of a blazed-grating structure in accordance with the invention.

The micro-prism 30 of FIG. 3 is formed by etching a mesa-structure 34 formed in substrate 32. Mesa structure 34 has mesa widths $W_1$–$W_n$ determined in accordance with Equation I, which result in formation of the prism shaped structure 38 (shown in dashed lines) when subjected to an effective heat treatment. Similarly, the blazed-grating structure 48, comprised of a series of prisms as in FIG. 4, is evolved from a mesa-structure 44 formed in substrate 42 using heat treatment to mass-transport the mesa material above the dotted line to fill in voids below the dotted line. Note that at points of abrupt slope transition in the desired contour an optional coating, for example of an oxide 46, may be provided to impede the mass-transport of material at that point. Without the coating, the slope transition becomes graded due to the mass transport. This is less desirable but may still be tolerated in some applications.

Figure 5:
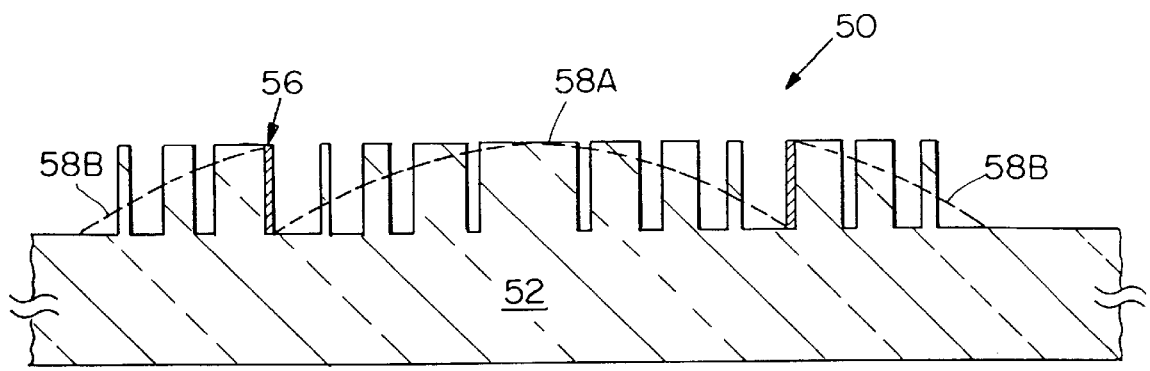
FIG. 5 is a cross-sectional schematic view illustrating formation of a desired optical element without excessive thickness by decomposing elements.

It is evident from the figures that deep narrow grooves and thin tall mesas are required under the present method to fabricate a thick optical element. Lithography and etching of these fine structures is difficult. One way to achieve a desired thick optical element, without excessive difficulty, is to decompose the element into segments 58A and 58B, as shown in the kinoform lens 40 of FIG. 5. However, very accurate control of the etched depth is needed for phase matching between segments, if a diffraction-limited performance of the element is required.

Figure 6A:
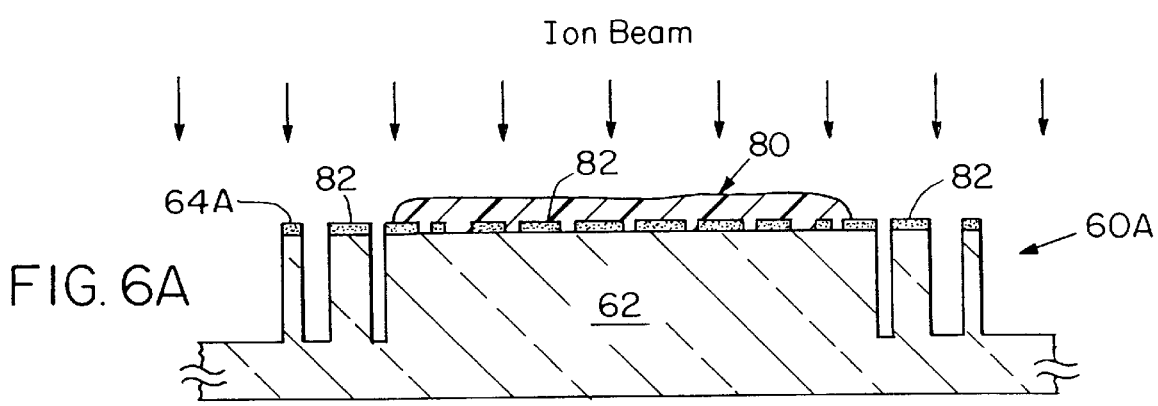
FIGS. 6A–6B are cross-sectional schematic process illustrations of an alternate embodiment for producing a thick optical element using more than one etching step.
Figure 6B:
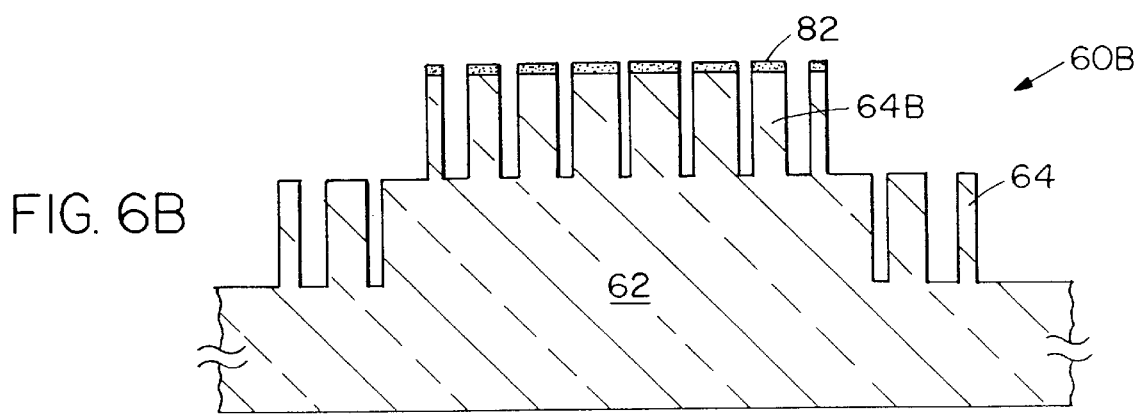

Another process for achieving a thick optical element requires more than one etching step, as illustrated in FIG. 6A and FIG. 6B. Also shown in FIGS. 6A and 6B is a lithography and etching method that can be applied to make the patterns in the different etched levels accurate and self-aligned. To re-pattern after a wafer has been deeply etched is usually very difficult and inaccurate. As shown in FIG. 6A, a precursor structure 60A is defined in a suitable substrate 62 by depositing a mask material 82, such as an oxide, on selected areas of a planar surface of substrate 62. Then, a layer of photoresist or other suitable material 80 is deposited over portions of the substrate which are not desired to be subjected to the initial etching step. The resultant structure is then subjected to etching to produce the mesa-structure 64A, shown in FIG. 6A on either side of the central planar surface covered by the resist material 80.

Next, the resist 80 is stripped along with the mask oxide 82 over the mesas 64A and the structure subjected to etching again, resulting in the two tiered mesa-structure of FIG. 6B having an upper mesa-structure 64B and a lower mesa-structure 64 coaxial thereto. This two tiered structure can then be heat treated, as previously described, to form an appropriate smooth inner and outer spherical lens surface. Preferably, the precursor pattern is formed such that the amount of mesa sidewalls per unit base area remains constant across the entire structure.

Yet another method for achieving thick optical elements is illustrated in FIG. 7A–7D. In this process, the entire optical element is first fabricated in sacrificial material, such as photoresist, but with a scaled-down thickness, and then transferred to the substrate, to the full thickness (photoresist has a slower etch rate), through ion milling.

In FIG. 7A, a sacrificial material, i.e., photoresist 74, is deposited on a suitable substrate 72 and a mesa pattern 90 defined in the resist. The resist is subjected to heat treatment to mass-transport a precursor optical-element contour surface 92, which has a scaled down contour thickness to the desired substrate pattern 94 (FIG. 7B). Then, as shown in FIG. 7C, the resist pattern 92 is transferred, at a larger scale, to the substrate 72 by ion-beam etching the resist, which has a slower etch rate than the substrate 72, to produce the contour surface 94. Surface 94 is then smoothed in FIG. 7D using the mass-transport process to produce the desired lens contour 96. Note that the photoresist does not have to be totally smoothed, since subsequent mass transport smoothing of the transferred pattern in the substrate can readily be accomplished. This eliminates the need for large scale photoresist flow and therefore ensures accuracy and control.

EQUIVALENTS

Those skilled in the art will recognize, or be able to ascertain, using no more than routine experimentation, many equivalents to the specific embodiments of the invention described herein.

Etching is preferred for removal of material but other techniques are contemplated such as sawing or laser ablation. Etching may also be accomplished by a variety of the techniques such as plasma etching, reactive ion etching, ion milling, ion beam assisted chemical etching, reactive ion-beam etching or chemical etching as long as the result is a high aspect ratio structure.

Also, rather than removing material to form the mesa structures, the structures may be formed by selective growth or deposition using mask techniques.

We claim:

1. A precursor structure for forming a predetermined curved surface when subjected to an effective heat treatment, comprising a solid body having a planar surface in which mesas of equal height H and unequal lateral width dimensions W are formed therein, and wherein W is a variable which is indirectly related to an approximation of the predetermined curved surface.

2. A structure as in claim 1 wherein the body is formed of optical material.

3. The structure of claim 1 wherein the mesas form concentric rings.

4. The structure of claim 1 wherein the mesas form spindles of varied length.

5. The structure of claim 1 wherein the mesas are equally spaced.

6. The structure of claim 1 wherein the curved surface is lens-shaped.

7. The structure of claim 1 wherein the curved surface is prism-shaped.

8. The structure of claim 1 wherein the curved surface is in the shape of a blazed grating.

9. The structure of claim 1 wherein the body is formed of Group III–V material.

10. The structure of claim 1 wherein the body is a phosphide.

11. A precursor structure for forming a predetermined curved surface when subjected to an effective heat treatment, comprising a solid body having a planar surface in which mesas of equal height H and unequal lateral W dimensions are formed therein, and W is equal to hs divided by H wherein h is the step height of a corresponding theoretical stepped mesa structure and s is equal to the center-to-center spacing between mesas.

12. A structure as in claim 11 wherein the body is formed of Group III–V optical material.

13. The structure of claim 11 wherein s is a constant.

14. The structure of claim 11 wherein the curved surface is lens-shaped.

15. The structure of claim 1 wherein the body is formed of GaP.

16. The structure of claim 11 wherein the body is formed of GaP or GaAs.

17. A structure for forming an element having a desired predetermined surface contour comprising a plurality of spaced apart non-stepped mesas, each mesa having a uniform height and a center-to-center spacing from one another with a void between them, and wherein the width W of the mesas is indirectly related to the predetermined contour of the surface of the element by the relationship W equals hs divided by H, wherein h is the height of the steps in a hypothetical stepped structure which would directly approximate the desired contour in accordance with a requirement that the volume of substrate material relocated from above a predetermined contour line must be equal to the volume to be filled below the predetermined contour line, and s is the center-to-center spacing between mesas and H is the mesa height.

18. A structure for forming an element having a predetermined smooth contour line comprising a plurality of adjacent mesas separated by voids of equal height, the width of the mesas being indirectly related to an approximation of the contour line.

19. A structure for forming an element which will have a predetermined surface contour comprising a plurality of spaced apart mesas with voids therebetween, and wherein at least two such mesas have widths that differ from one another, and wherein the width of the mesas is a variable which is indirectly related to an approximation of the predetermined contour.

* * * * *